United States Patent
Hughes

(10) Patent No.: US 8,832,842 B1
(45) Date of Patent: Sep. 9, 2014

(54) STORAGE AREA NETWORK EXTERNAL SECURITY DEVICE

(75) Inventor: James P. Hughes, Herndon, VA (US)

(73) Assignee: Oracle America, Inc., Redwood City, CA (US)

(*) Notice: Subject to any disclaimer, the term of this patent is extended or adjusted under 35 U.S.C. 154(b) by 1371 days.

(21) Appl. No.: 10/680,579

(22) Filed: Oct. 7, 2003

(51) Int. Cl.
G06F 11/00 (2006.01)
G06F 21/56 (2013.01)
G06F 21/60 (2013.01)
H04L 29/06 (2006.01)

(52) U.S. Cl.
CPC ............ G06F 21/567 (2013.01); G06F 21/606 (2013.01); H04L 63/0281 (2013.01); H04L 63/145 (2013.01)
USPC ........ 726/26; 726/3; 726/4; 726/12; 713/153; 713/165

(58) Field of Classification Search
CPC . G06F 21/567; G06F 21/606; G06F 21/6218; G06F 21/55; H04L 63/0281; H04L 63/145; H04L 63/1491; H04L 63/1441; H04L 63/1416; H04L 63/101; H04W 12/08
See application file for complete search history.

(56) References Cited

U.S. PATENT DOCUMENTS

| | | | | |
|---|---|---|---|---|
| 5,692,124 A * | 11/1997 | Holden et al. | ..................... | 726/2 |
| 5,940,591 A * | 8/1999 | Boyle et al. | ....................... | 726/3 |
| 6,336,175 B1 * | 1/2002 | Shaath et al. | ................. | 711/163 |
| 6,484,173 B1 * | 11/2002 | O'Hare et al. | .................... | 707/9 |
| 6,597,566 B1 * | 7/2003 | Phan | .............................. | 361/683 |
| 7,150,042 B2 * | 12/2006 | Wolff et al. | ..................... | 726/22 |
| 2002/0046351 A1 * | 4/2002 | Takemori et al. | ............ | 713/201 |
| 2002/0156984 A1 * | 10/2002 | Padovano | ...................... | 711/148 |
| 2003/0110263 A1 * | 6/2003 | Shillo | ............................ | 709/226 |
| 2003/0188174 A1 * | 10/2003 | Zisowski | ...................... | 713/189 |
| 2004/0111636 A1 * | 6/2004 | Baffes et al. | .................. | 713/201 |

* cited by examiner

Primary Examiner — Shewaye Gelagay
(74) Attorney, Agent, or Firm — Brooks Kushman P.C.

(57) ABSTRACT

An external security device is provided in the communication path between devices of different security levels. A higher security device needs only to trust the security of the external device, rather than relying on operating system and file system software that cannot be assured. The external security device blocks access requests that may be using covert channels, but returns status information that indicates that the request is successful. The external security device may then audit access requests to provide a higher level of accountability. The external security device also handles data duplication to prevent or significantly reduce the threat of traffic analysis.

23 Claims, 3 Drawing Sheets

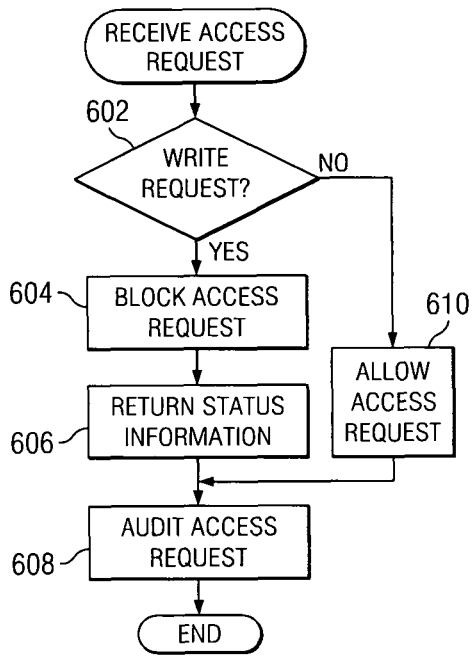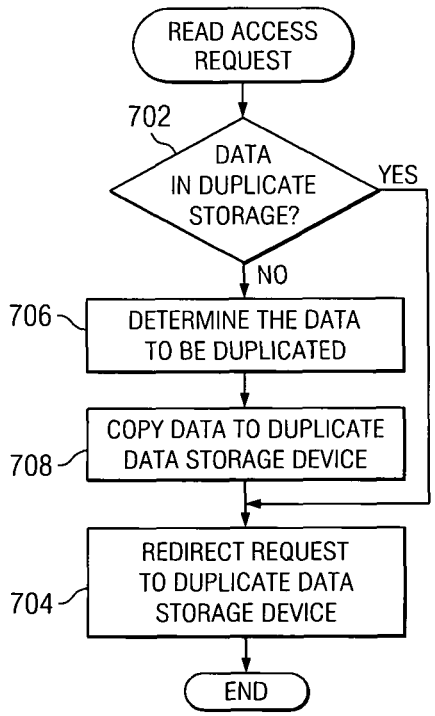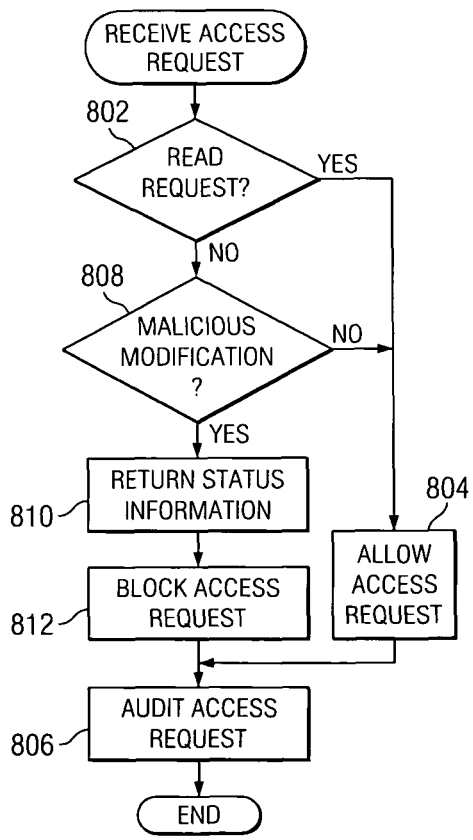

STORAGE AREA NETWORK EXTERNAL SECURITY DEVICE

BACKGROUND OF THE INVENTION

1. Technical Field

The present invention relates to storage systems in a network environment and, in particular, to protecting highly sensitive information in a storage area network.

2. Description of Related Art

A client/server environment is an architecture in which a user's device, such as a computer, is a requesting machine and a server is the supplying machine. Both devices may be connected via a network, such as a local area network (LAN) or wide area network (WAN). An example of a client/server environment is the Internet, which includes a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages.

A Storage Area Network (SAN) is a network of storage disks. In large enterprises, a SAN connects multiple servers to a centralized pool of disk storage. Compared to managing hundreds of servers, each with its own disks, SANs improve system administration by treating all the company's storage as a single resource.

With the advent of Storage Area Networks and the ability to connect multiple machines to the same storage, new problems arise concerning the security of information. Multiple levels of sharing storage are possible in Storage Area Networks. A lower level device may write, read, and manage a file system and another device at a higher level (or the same level, but more restricted) may be only able to read the information. Using this configuration, a method of "raising" the information to a higher level is possible. Security systems are used to ensure that a user or device at a higher level is not able to leak sensitive information to a user or device at a lower level.

A covert channel is a transfer of information that violates a computer's built-in security systems. A covert storage channel refers to depositing information in a memory or storage location that can be accessed by different security clearances. A covert timing channel is the manipulation of a system resource in such a way that it can be detected by another process.

For example, a device may set a flag that is otherwise unused to signal an event, such as a corporate buy-out, to a lower level user or device, such as a stockholder. This is an example of a covert channel. A device may also perform an access request periodically to signal an event. For example, a user of a device may perform a read of a given data block once a second for a minute to leak the occurrence of an event, such as a military air strike. This example illustrates a covert timing channel. Covert channels may even be used to leak information using Morse code, such as, for example, by toggling a bit or flag in such a way as to communicate a message.

A lower level device may also perform traffic analysis to deduce highly sensitive information. An analysis of what files a higher level device accesses may be a significant threat to sensitive information.

Covert channels are difficult to detect or prevent. This poses a problem for owners of highly sensitive information. Therefore, it would be advantageous to provide an improved mechanism for preventing, detecting, and auditing covert channels.

SUMMARY OF THE INVENTION

The present invention provides read assurance device in a communication path between a high level device and a low level storage device. The read assurance device assures that the data on the low level storage device cannot be modified by the higher level machine. Therefore, covert channels are blocked. The read assurance device may also audit access requests performed through the communication path. Thus, any covert channels or covert timing channels are blocked, reduced, or audited. Auditing provides accountability for any covert channels or covert timing channels that are not blocked.

Mainly, the read assurance device blocks write requests from the higher level device. The mechanism of the present invention may also return status information to the higher level device to make the higher level device think that the covert channel was successful. This may allow for repeated attacks, allowing the device to audit more information, which may improve accountability for channels that are detected and blocked.

The read assurance device may also perform data duplication to copy large amounts data from the lower level storage into a higher level storage totally within the control of the higher level system. This allows the higher level machine to access the higher level storage without the threat of traffic analysis.

The present invention also provides a write assurance device in a communication path between a low level device and a high level storage device. A write assurance device may be used where the storage itself is under control of the high level machine. Write assurance may be used in conjunction with a read assurance device to allow the low level machine read and write access to the partitions, but deny all management and non-data channels and also to deny the ability to maliciously modify the storage devices themselves. The mechanism of the present invention may also return status information to the lower level device when the lower level device attempts to make malicious modifications to the storage device. Thus, the mechanism makes the lower level device think that the covert channel was successful. This may allow for repeated attacks, allowing the device to audit more information, which may improve accountability for channels that are detected and blocked.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 6 is a flowchart illustrating the operation of a read assurance device in accordance with a preferred embodiment of the present invention;

FIG. 7 illustrates a flowchart of the operation of a read assurance device with data duplication in accordance with a preferred embodiment of the present invention; and FIG. 8 is a flowchart illustrating the operation of a write assurance device in accordance with a preferred embodiment of the present invention.

DETAILED DESCRIPTION OF THE PREFERRED EMBODIMENT

Figure 1:
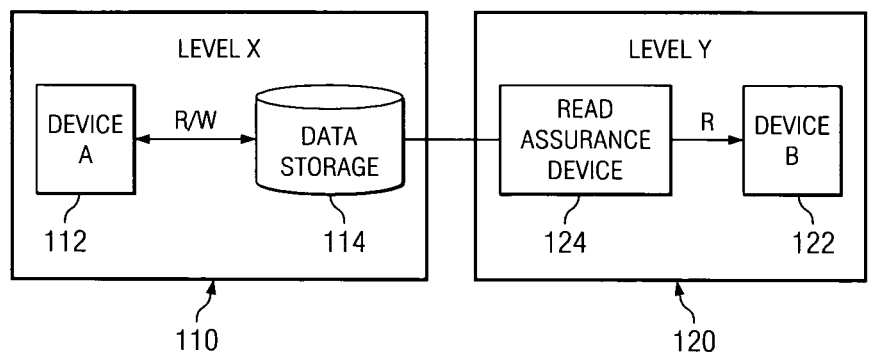
FIG. 1 depicts a pictorial representation of a storage area network with a storage device controlled by a lower level device in accordance with a preferred embodiment of the present invention may be implemented.

With reference now to the figures, FIG. 1 depicts a pictorial representation of a storage area network with a storage device controlled by a lower level device in accordance with a preferred embodiment of the present invention may be implemented. Device A 112 controls data storage 114. Device B 122 is connected to data storage 114 via a communication path, such as a network.

Device A and data storage 114 are within a lower level of security, level X 110, while device B is within a higher level of security, level Y 120. In other words, level Y is greater than level X. Since device B is within a higher level of security, it is important that any highly sensitive information is not leaked to data storage 114 or device A 112.

Device A and device B may include operating system and file system software that prevents contamination on the part of the respective devices. For example, a file system may be used that allows the ability to read objects without using any device write operations. This allows the lower level machine to own the file system, locks, the meta-data (directory information), and the customer's data. This also allows the higher level machine only to read and never to perform writes, locks, or to modify meta-data or the customer's data in any way.

However, a user of device B may still use covert channels or covert timing channels to leak information without detection by operating system or file system software. Furthermore, an operating system or file system implementation within an untrusted operating system cannot be assured.

Covert channels, as described herein may be intentional or, alternatively, unintentional. For example, a covert timing channel may be exposed to a user of device B without the knowledge of the user of device A. Covert channels and covert timing channels may also result, for example, from misconfiguration of one or both of the devices.

In accordance with a preferred embodiment of the present invention, an external security device is used in the communication path between the high level device and the low level storage device. A security device refers to hardware or software that interposes itself between a client device and a storage device to assure its operation. This could be internal or external to the client device or the storage device. When internal, the security device may be implemented in a trusted computing base within the client device or the storage device.

A trusted computing base is a security platform, that provides numerous security solutions, including user authentication, local data encryption, privacy safeguards, prevention of viruses, and digital rights management. A trusted computing base may require a special chip to be included within the device. An example of a trusted computing base is Palladium from Microsoft Corporation.

An example of an external security device is read assurance device 124, which is provided in the communication path between device B 122 and the low level storage device 114. The read assurance device assures that the data on the low level storage device cannot be modified by the higher level machine. In other words, any access requests received from device B that attempt to perform any writes or locks or to modify the data or meta-data in any way are blocked by the read assurance device. Therefore, covert channels are blocked and covert timing channels are greatly reduced.

The read assurance device may also audit access requests performed through the communication path. Thus, any covert channels or covert timing channels are blocked, reduced, or audited. Auditing provides accountability for any covert channels or covert timing channels that are not blocked.

The external security device is an improvement over similar operations performed with NAS, Windows NT (CIFS), or Unix (NFS) based protocols. In NAS or NFS based protocols, the reader must communicate the file to open or use Remote Procedure Call (RPC). Communication of the file to open is difficult to validate. This information may be a significant covert channel that can only be audited. RPC is a rich and covert channel laden protocol that is running over TCP/IP or User Diagram Protocol/Internet Protocol (UDP/IP). Devices to assure these protocols are expensive to create and maintain.

The read assurance device of the present invention, however, limits the requirements from the higher level system to a simple subset of the lower level storage device's feature set, which allow no data or information to be written. The read assurance device also provides these features, including audit storage, in a self-contained and secure device.

Traffic analysis allows a user or device to monitor which sectors the higher level machine is accessing. The analysis of which files are being accessed may be a significant threat. For example, a device that controls a data storage device in a lower security level may monitor files being accessed by a higher level device. This information may reveal the interests or intentions of the owner of the higher level device.

Figure 2:
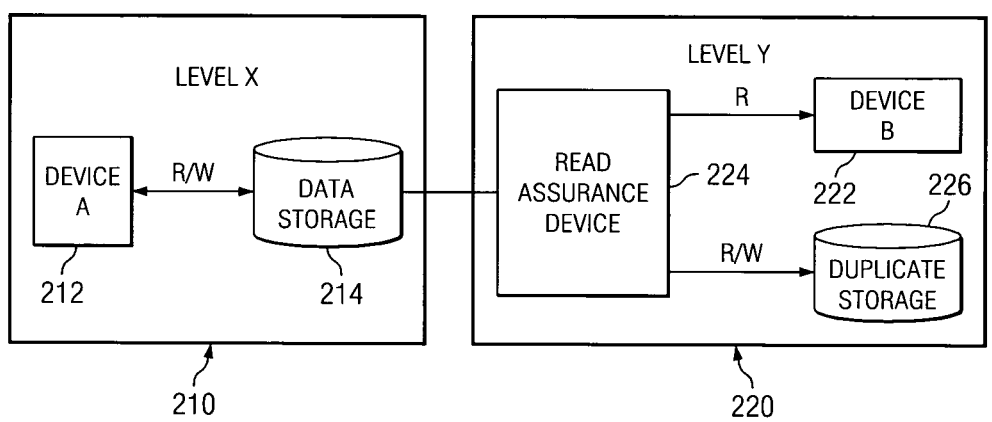
FIG. 2 is a block diagram illustrating a storage area network with data duplication in accordance with a preferred embodiment of the present invention.

With reference to FIG. 2, a block diagram illustrating a storage area network with data duplication is shown in accordance with a preferred embodiment of the present invention. Device A 212 controls data storage 214. Device B 222 is connected to data storage 214 via a communication path, such as a network.

Device A and data storage 214 are within a lower level of security, level X 210, while device B is within a higher level of security, level Y 220. In other words, level Y is greater than level X. Since device B is within a higher level of security, it is important that traffic analysis cannot be performed to deduce information from the pattern and timing of files accessed by device B from data storage 214.

In accordance with a preferred embodiment of the present invention, an external security device is used in the communication path between the high level device and the low level storage device. An example of an external security device is read assurance device 224, which is provided in the communication path between device B 222 and the low level storage device 214. The read assurance device assures that the data on the low level storage device cannot be modified by the higher level machine.

Read assurance device 224 also provides data duplication from data storage 214 onto duplicate data storage 226. When the read assurance device receives a request from device B to read data from data storage 214, the read assurance device determines whether the requested data is present in duplicate data storage 226. If the data is present in duplicate data storage, the request is redirected to the duplicate data storage.

If, however, the data is not present in duplicate data storage, a significant portion of data storage 214, such as a whole directory, partition, file system, etc., is copied from data storage 214 to duplicate data storage 226. Since the read assurance device copies large amounts of data, the amount of information that can be deduced from traffic analysis is greatly reduced or even eliminated.

Figure 3:
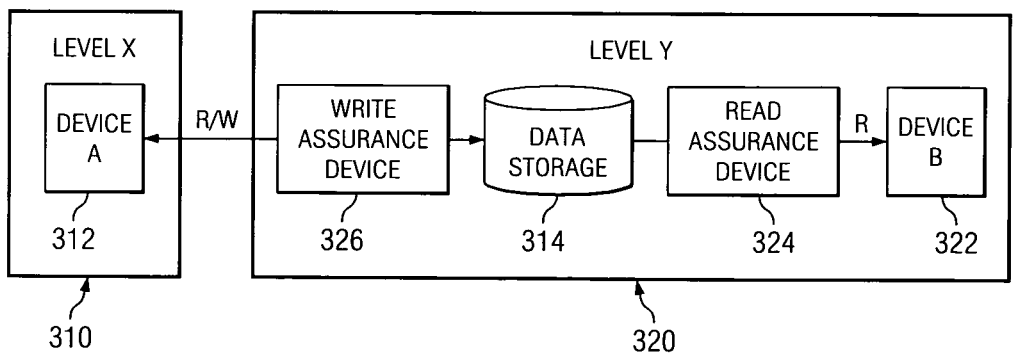
FIG. 3 is a block diagram illustrating a storage area network with traffic analysis protection using a write assurance device in accordance with a preferred embodiment of the present invention.

Turning now to FIG. 3, a block diagram illustrating a storage area network with traffic analysis protection using a write assurance device is shown in accordance with a preferred embodiment of the present invention. Device B 322 controls data storage 314. Device A 312 is connected to data storage 314 via a communication path, such as a network.

Device B and data storage 314 are within a higher level of security, level Y 320, while device A is within a lower level of security, level X 310. In other words, level Y is greater than level X. Since device B is within a higher level of security, it is important that traffic analysis cannot be performed to deduce information from the pattern and timing of files accessed by device B from data storage 314.

Device A may obtain this information by writing malicious code to data storage 314. This malicious code may operate to leak traffic information to the lower level device. Malicious code may include, for example, Trojan Horse programs, "spyware," or other harmful programs, such as viruses. Device A may make other malicious modifications to the data or to other non-data channels.

In accordance with a preferred embodiment of the present invention, an external security device is used in the communication path between the low level device and the high level storage device. An example of an external security device is write assurance device 364, which is provided in the communication path between device A 312 and the high level storage device 314. The write assurance device allows the lower level machine read and write access to the partitions, but denies all management and non-data channels and also denies the ability to maliciously modify the storage devices themselves.

Read assurance device 324 is provided in the communication path between device B 322 and data storage device 314. The read assurance device assures that the data on the high level storage device cannot be modified by the higher level machine. In other words, any access requests received from device B that attempt to perform any writes or locks or to modify the data or meta-data in any way are blocked by the read assurance device. Therefore, covert channels that may be read by device A are blocked and covert timing channels are greatly reduced.

The read assurance device may also audit access requests performed through the communication path. Thus, any covert channels or covert timing channels are blocked, reduced, or audited. Auditing provides accountability for any covert channels or covert timing channels that are not blocked.

The external security devices described in FIGS. 1-3 may be enclosed in a tamper proof housing. Other security mechanisms may be used, as known in the art. For example, an alarm may sound to signal any disconnection of network or other communication cables. Therefore, the external security devices may be configured to prevent or call attention to any attempts to bypass, harm, or modify the external security device.

Figure 4:
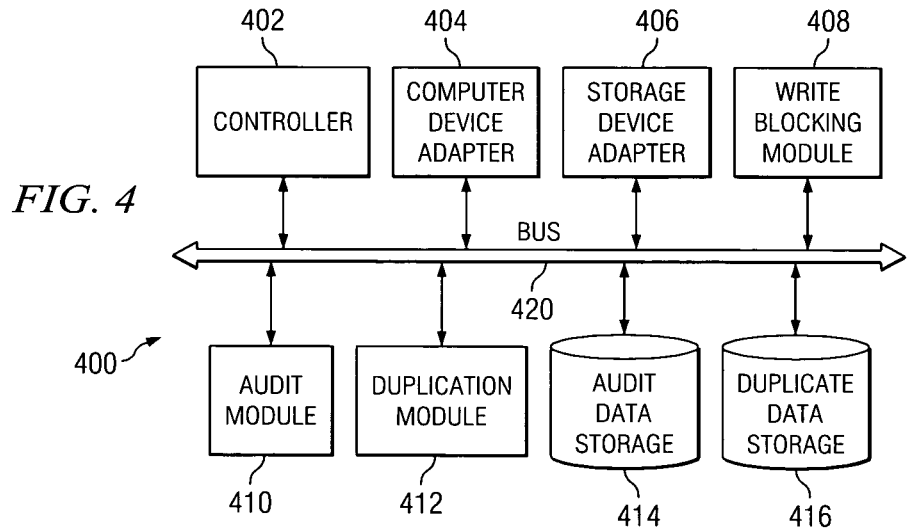
FIG. 4 is an exemplary block diagram of a read assurance device in accordance with a preferred embodiment of the present invention.

FIG. 4 is an exemplary block diagram of a read assurance device in accordance with a preferred embodiment of the present invention. Read assurance device 400 includes controller 402, computer device adapter 404, storage device adapter 406, write blocking module 408, audit module 410, duplication module 412, audit data storage 414, and duplicate data storage 416. The elements 402-416 may be implemented as hardware, software, or a combination of hardware and software. In a preferred embodiment, the elements 404-416 are implemented as software instructions executed by one or more processors.

The elements 402-416 are coupled to one another via the control/data signal bus 420. Although a bus architecture is shown in FIG. 4, the present invention is not limited to such. Rather, any architecture that facilitates the communication of control/data signals between elements 402-416 may be used without departing from the spirit and scope of the present invention. The controller 402 controls the overall operation of the read assurance device and orchestrates the operation of the other elements 404-416.

With the operation of the present invention, write blocking module 408 instructs controller 402 to identify access requests received through computer device adapter 404 and to block any requests to write or modify data. Controller 402 allows other requests, such as read requests, and passes these requests to storage adapter 406. Controller 402, under control of audit module 410 may also log all access requests in audit data storage 414.

Write blocking module 408 also instructs controller 402 to return status information to the requesting device indicating that that the blocked requests are successful. Perhaps given a seemingly successful attempt the offending device or user will continue to attempt to breach the read assurance device, thus allowing the audit module to audit more requests.

In a preferred embodiment of the present invention, read assurance device 400 may perform data duplication for read requests received through computer device adapter 404. If a read request is received, controller 402, under control of duplication module 412, determines whether the requested data is present in duplicate data storage 416. If the data is present in duplicate data storage, the request is redirected to the duplicate data storage.

If, however, the data is not present in duplicate data storage 416, a significant portion of the data stored in the requested data storage device, such as a whole directory, partition, file system, etc., is copied from data storage device to duplicate data storage 416.

Computer device adapter 404 and storage device adapter 406 may be conventional communications adapters, such as for example network adapters. Preferably audit storage 414 and duplicate data storage 416 are contained within the enclosure of the read assurance device. However, either the audit data storage, the duplicate data storage, or both may be stored elsewhere in the communication path, such as within a network, or attached by means of an adapter, such as Small Computer System Interface (SCSI) or Universal Serial Bus (USB) interface. In a preferred embodiment, read assurance device 400 may be enclosed within a secure, tamper proof housing.

Figure 5:
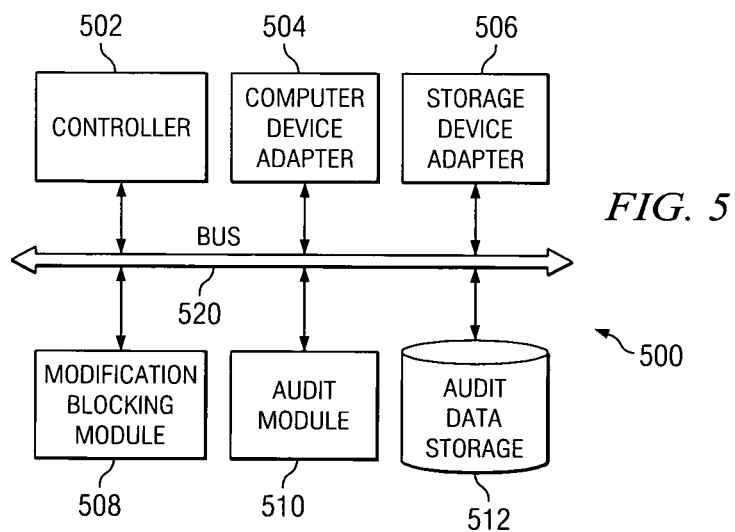
FIG. 5 is an exemplary block diagram of a write assurance device in accordance with a preferred embodiment of the present invention.

FIG. 5 is an exemplary block diagram of a write assurance device in accordance with a preferred embodiment of the present invention. Write assurance device 500 includes controller 502, computer device adapter 504, storage device adapter 506, malicious modification module 508, audit module 510, and audit data storage 512. The elements 502-512 may be implemented as hardware, software, or a combination of hardware and software. In a preferred embodiment, the elements 504-512 are implemented as software instructions executed by one or more processors.

The elements 502-512 are coupled to one another via the control/data signal bus 520. Although a bus architecture is shown in FIG. 5, the present invention is not limited to such. Rather, any architecture that facilitates the communication of control/data signals between elements 502-512 may be used without departing from the spirit and scope of the present invention. The controller 502 controls the overall operation of the write assurance device and orchestrates the operation of the other elements 504-512.

With the operation of the present invention, malicious modification blocking module 508 instructs controller 502 to identify access requests received from computer device adapter 504 that attempt to maliciously modify a storage device and to block any such requests. Controller 502, under control of audit module 510 may also log all access requests in audit data storage 512.

Write blocking module 508 also instructs controller 502 to return status information to the requesting device indicating that that the blocked requests are successful. Perhaps given a seemingly successful attempt the offending device or user will continue to attempt to breach the read assurance device, thus allowing the audit module to audit more requests.

Computer device adapter 504 and storage device adapter 506 may be conventional communications adapters, such as for example network adapters. Preferably audit storage 512 is contained within the enclosure of the write assurance device. However, the audit data storage may be stored elsewhere in the communication path, such as within a network, or attached by means of an adapter, such as Small Computer System Interface (SCSI) or Universal Serial Bus (USB) interface. In a preferred embodiment, write assurance device 500 may be enclosed within a secure, tamper proof housing.

With reference to FIG. 6, a flowchart illustrating the operation of a read assurance device is shown in accordance with a preferred embodiment of the present invention. The process begins when an access request is received and a determination is made as to whether the request is a write request (step 602). In the context of this flowchart a write request includes a request to perform a write, a lock, or to modify the meta-data or the stored data in any way.

If the access is a write request, the process blocks the access request (step 604) and returns status information indicating that the request was successful (step 606). Then, the process audits the access request (step 608) and ends.

If, however, the access request is not a write request in step 602, the process allows the request (step 610) and proceeds to step 608 to audit the request. Thereafter, the process ends.

In step 610, when the access request is allowed, the read assurance device may perform data duplication. FIG. 7 illustrates a flowchart of the operation of a read assurance device with data duplication in accordance with a preferred embodiment of the present invention. The process begins when a read request is received and a determination is made as to whether the data is present in duplicate storage (step 702). If the data is present, the process redirects the request to the duplicate data storage device (step 704) and ends.

If the data is not present in step 702, the process determines an amount of data to be duplicated (step 706) and copies the determined amount of data to duplicate data storage (step 708). Then, the process proceeds to step 704 to redirect the request to the duplicate data storage device. Thereafter, the process ends.

Turning now to FIG. 8, a flowchart illustrating the operation of a write assurance device is shown in accordance with a preferred embodiment of the present invention. The process begins when an access request is received and a determination is made as to whether the request is a read request (step 802).

If the access request is a read request, the process blocks the access request (step 804), audits the access request (step 806), and ends.

If, however, the access request is not a read request in step 802, a determination is made as to whether the request is an attempt to perform a malicious modification (step 808). In the context of this flowchart, a malicious modification is an attempt to write malicious code, an attempt to access management and non-data channels, or an attempt to maliciously modify the storage devices themselves.

If the access request is not an attempt to perform a malicious modification, the process allows the access request (step 810) and proceeds to step 806 to audit the access request and end. If the access request is an attempt to perform a malicious modification in step 808, the process returns status information indicating that the request is successful (step 812) and proceeds to step 804 to block the access request. Thereafter, the process audits the request (step 806) and ends.

Thus, the present invention solves the disadvantages of the prior art by providing an external security device in the communication path between devices of different security levels. A higher security device needs only to trust the security of the external device, rather than relying on operating system and file system software that cannot be assured. The external security device blocks access requests that may be using covert channels, but returns status information that indicates that the request is successful. The external security device may then audit access requests to provide a higher level of accountability. The external security device also handles data duplication to prevent or significantly reduce the threat of traffic analysis.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for preventing communication through covert channels, the method comprising:
   providing a security device between a higher level security device and a lower level security device, wherein the higher level security device is a storage device;
   detecting, by the security device, an access request from one of the devices to the other of the devices, wherein the access request is an attempt to write malicious code, an attempt to access management and non-data channels, or an attempt to maliciously modify the storage device;
   blocking, by the security device, the access request such that in response to the access request, no access is granted; and returning, by the security device, status information that indicates that the access request is successful if no access is granted.

2. The method of claim 1, wherein the lower level security device is a storage device.

3. The method of claim 2, wherein the access request is a write request.

4. The method of claim 1, further comprising: detecting, by the security device, a request to read a storage device controlled by the lower level security device;

determining, by the security device, an amount of data to copy to a duplication data storage device; and copying, by the security device, the amount of data to the duplication data storage device.

5. The method of claim 4, further comprising:

redirecting the read request to the duplication data storage device.

6. The method of claim 1, further comprising:

auditing the access request.

7. The method of claim 6, wherein the step of auditing the access request includes storing a log of the access request in an audit data storage contained within the security device.

8. The method of claim 1, wherein the security device is an external device.

9. The method of claim 8, wherein the external security device is contained within a tamper resistant housing.

10. The method of claim 1, wherein the security device is internal to one of the higher level security device and lower level security device.

11. The method of claim 1, wherein the security device is implemented in a trusted computing base.

12. The method of claim 1, wherein the security device is implemented in a trusted software platform.

13. An apparatus for preventing communication through covert channels, the apparatus comprising:

a higher level security device, wherein the higher level security device is a storage device;

a lower level security device; and a security device connected between the higher level security device and the lower level security device, wherein the security device detects an access request from one of the devices to the other of the devices, wherein the access request is an attempt to write malicious code, an attempt to access management and non-data channels, or an attempt to maliciously modify the storage device, wherein the security device blocks the access request such that in response to the access request, no access is granted and wherein the security device returns status information that indicates that the access request is successful if no access is granted.

14. The apparatus of claim 13, wherein the lower level security device is a storage device.

15. The apparatus of claim 14, wherein the access request is a write request.

16. The apparatus of claim 13, further comprising: a duplicate data storage, wherein the security device detects a request to read a storage device controlled by the lower level security device, determines an amount of data to copy to a duplication data storage device, and copies the amount of data to the duplication data storage device.

17. The apparatus of claim 16, wherein the security device redirects the read request to the duplication data storage device.

18. The apparatus of claim 13, further comprising:

an audit data storage, wherein the security device stores a log of the access request in the audit data storage device.

19. The apparatus of claim 13, wherein the security device is an external device.

20. The apparatus of claim 19, wherein the external security device is contained within a tamper resistant housing.

21. The apparatus of claim 13, wherein the security device is internal to one of the higher level security device and the lower level security device.

22. The apparatus of claim 13, wherein the security device is implemented in a trusted computing base.

23. The apparatus of claim 13, wherein the security device is implemented in a trusted software platform.

* * * * *